INVENTOR.
THOMAS M. JULOW

INVENTOR.
THOMAS M. JULOW
BY
Richard G. Geib
ATTORNEY

United States Patent Office 3,452,644
Patented July 1, 1969

3,452,644
DECELERATION SENSITIVE REACTION FOR A FLUID PRESSURE SERVOMOTOR
Thomas M. Julow, South Bend, Ind., assignor to The Bendix Corporation, a corporation of Delaware
Filed Feb. 13, 1967, Ser. No. 615,790
Int. Cl. F15b *13/16, 9/10;* B60k *8/14*
U.S. Cl. 91—367                                             12 Claims

ABSTRACT OF THE DISCLOSURE

In a fluid pressure servomotor control means a mass to sense deceleration forces and create a reactive force on an operator-operated control means for a fluid pressure servomotor.

Summary

In fluid pressure operated servomotors, and more particularly with regard to such servomotors for actuating power brakes of automotive vehicles, it has become quite apparent that ways must be provided for maintaining a constant sense of feel for any deceleration value. Present day power brake servomotors provide a feel that is proportioned to brake fluid pressure. This is considered a disadvantage in view of varying brake torque characteristics due to variances in temperature, moisture, drum and shoe condition, etc.

Thus, this invention provides for the actuation of a fluid pressure servomotor with little or no reaction forces being attendant to the initial operation and as soon as deceleration forces become apparent, a reaction force will be proportionally provided to the driver.

Drawing description

Figure 1:
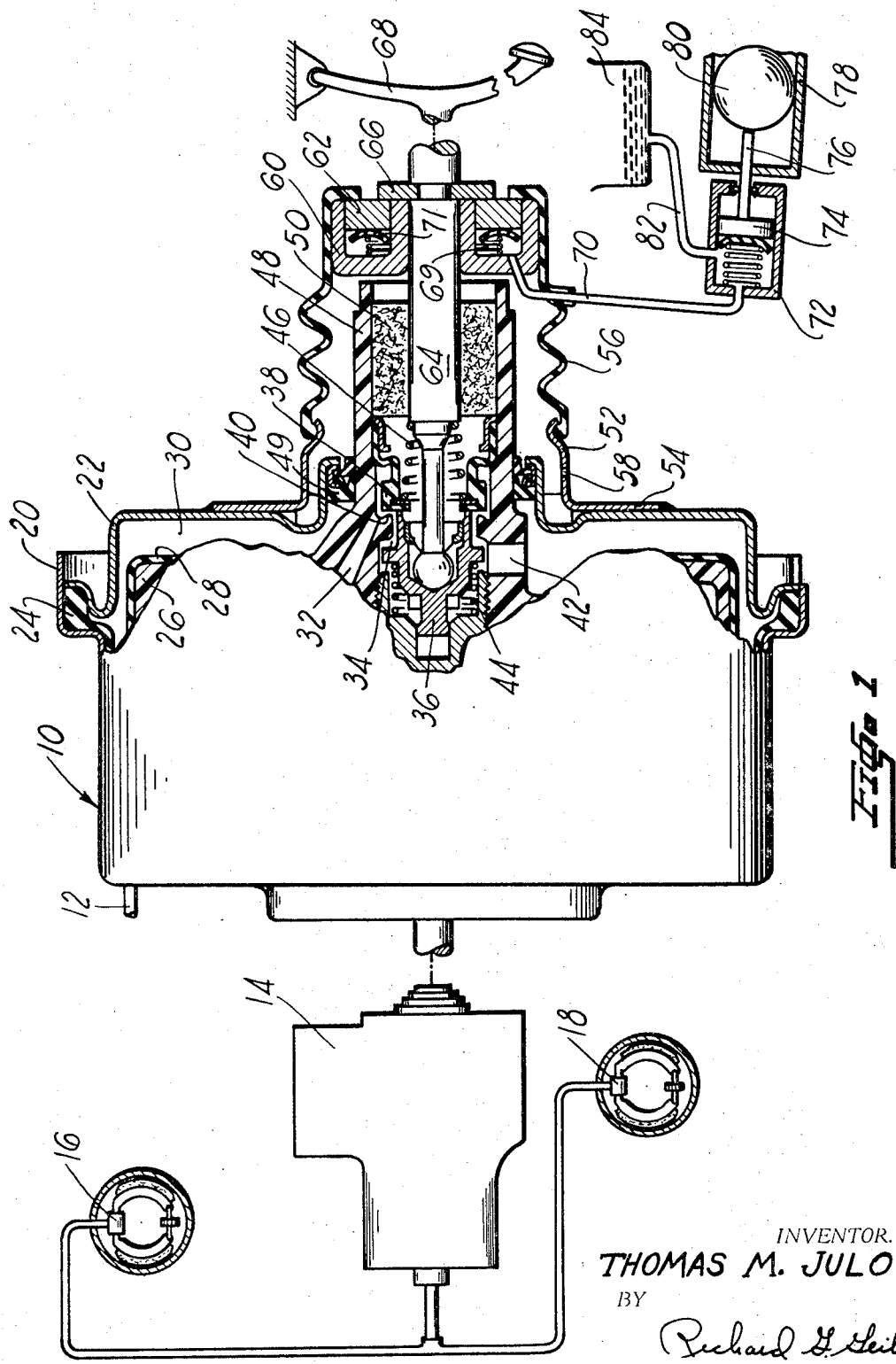
Figure 2:
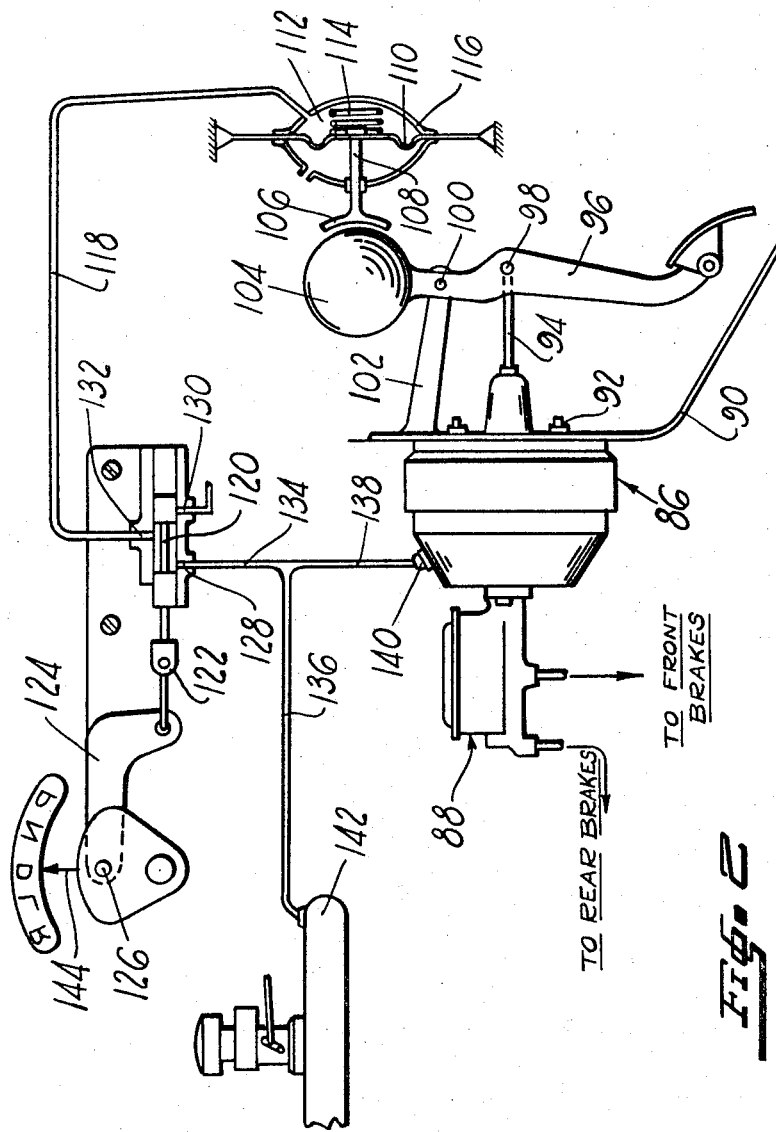

FIGURE 1 of the drawing shows a conventional power brake servomotor and braking system in schematic form with a portion of the power brake servomotor being broken away to show the operative relation thereto of a deceleration sensitive reaction means in accordance with the principles of this invention that is also shown in schematic cross section; and FIGURE 2 shows in schematic form another embodiment of the invention utilizing a mechanical arrangement to provide feel in accordance with deceleration forces attendant to braking of an automobile.

Detailed description

With regard to FIGURE 1 there is shown a power brake servomotor 10 that is connected as by a conduit 12 to an intake manifold (not shown) of an automobile engine for the supply of vacuum thereto. The servomotor is connected to a master cylinder 14 that has conduits leading therefrom to a wheel cylinder 16 of the front wheel brakes and to a wheel cylinder 18 of the rear wheel brakes. As will be readily apparent to those skilled in the art to which this invention relates, the master cylinder 14 is shown as a conventional non-split type for purposes of illustration only. It should be understood that the present day split-system type master cylinders may be just as readily employed as is the conventional master cylinder 14 with the servomotor 10. (See FIGURE 2.)

The servomotor 10 is constructed to have forward and rear shells 20 and 22, respectively, joined as by a twist lock connection with a diaphragm bead 24 interposed to seal the juncture of same. It also includes a movable wall 28 comprised of a plastic wall 26 and a diaphragm 28 that is operatively connected thereto to provide a vacuum supply chamber (not shown) in front of the movable wall and a control chamber 30 to the rear of same.

These chambers are normally suspended in vacuum by means of a passage 32 through the plastic movable wall 26 that leads to a valve chamber 34. Within the valve chamber a valve poppet 36 is slidably arranged to cooperate with a flexible, annular valve seat 38 to permit the vacuum supply within the passage 32, in the released attitude of the servomotor, as shown, to pass about the valve seat 40 formed on the plastic wall 26 from the passage 32 to a radial passage 42 into the control chamber 30.

The valve poppet 36 is urged by a return spring 44 to abut on the flexible valve seat 38 in opposition to a valve follow-up spring 46 to maintain the flexible seat 38 removed from the seat 40 of the wall 26 in the released attitude. It may thus be realized by those skilled in the art to which this invention relates that the valve return spring 44 is stronger than the valve follow-up spring 46.

The movable wall is formed to have a tubular boss 48 for carrying these valve members that project exteriorly of the rear shell 22 through a seal and guide structure 49. The tubular boss contains an atmospheric air filter 50 at its rearwardmost end to prevent dirt and other contaminants from entering the servomotor during the operation thereof.

The rear shell 22 is shown to have a tubular afterbody 52 with a flange 54 welded to the rear shell 22 for mounting a rubber boot 56, either of which may have appropriately located atmospheric air inlets, such as is shown as at 58 in the tubular afterbody 52. The rubber boot at its rearward end mounts an annular housing 60 for a piston 62 of a fluid pressure motor that is adapted to snuggly fit around a push rod 64 connected to the valve poppet 36. The piston 62 cooperates with a snap ring 66 inserted within an appropriate recess of the push rod 64. The push rod 64 is connected to a brake pedal 68 within the vehicle that is controlled by the driver.

Within the annular housing 60 a spring 69 is located to retain a seal 71 on the piston 62. The spring 69 is just strong enough to maintain the piston 62 against the snap ring 66 on the push rod 64.

A fluid conduit 70 leads from the rear of the housing 60 to a pressure generating device in the form of a fluid pressure actuator 72 having a piston 74 with a stem 76 extending exteriorly thereof into an angled housing 78 containing a ball weight 80. The actuator 72 is connected by a conduit 82 to a fluid pressure reservoir 84 providing hydraulic fluid to the actuator that is used in controlling the piston 62.

Passing now to the embodiment shown by FIGURE 2 there is shown a less sophisticated mechanical system for providing a uniform feel for similar deceleration values. As in FIGURE 2 a power brake servomotor 86 is utilized to pressurize a split system master cylinder 88 bolted to it. The servomotor is bolted to an automobile firewall 90 separating the engine compartment from the passenger compartment, as at 92. A valve push rod 94, similar to push rod 64, is connected to brake pedal lever 96, as at 98. This lever 96 is pivoted, as at 100, to an arm 102 also affixed to the firewall 90 to support the brake pedal from its upper end, as is the practice in today's cars to provide sufficient leverage.

A mass 104 is affixed to the lever 96 if not formed therewith, to be above the connection 100 so that it will move opposite to the operator force on the brake pedal. The mass 104 is chosen to have the proper weight in relation to its lever arm from the pivot point of the connection 100 so that deceleration forces on the vehicle body will swing the mass 104 opposite to the thrust of the driver's foot on the brake pedal.

In order to preclude the mass from self-energization of the brakes in reverse operation of the vehicle, a stop 106, that is actuatable through rod 108 to which it is joined by a diaphragm 110 biased in absence of vacuum in chamber 112 by a spring 114, abuts the mass 104 and feel for braking in reverse is provided by spring 114.

The diaphragm 110 is in a vacuum motor housing 116 that is affixed to structure in the passenger compartment adjacent the mass 104. The chamber 112 is communicated by means of a conduit 118 to a slide valve 120 connected by linkage 122 to quadrant 124 controllable by pin 126 from a gear shift selecter lever (not shown). The slide valve is arranged to control a vacuum port 128 or atmosphere port 130 is open to a control port 132 to which conduit 118 is connected.

The vacuum port 128 is connected to a branch 134 of conduit 136 which has another branch 138 connected to a vacuum check valve 140 controlling vacuum supply to the servomotor 10. At its other end the vacuum conduit 136 is connected to engine intake manifold 142.

*Operation*

With regard to the operation of the structure of FIGURE 1, the driver of the automobile after pivoting his foot about his heel from the accelerator pedal and upon depression of the brake pedal 68 the valve poppet 36 will move inwardly of the wall 26 whereby the flexible seat 38 may abut on the seat 40 of the movable wall. Further movement, which by the way is still only subjected to the reaction of the valve return spring 44, will then separate the valve poppet 36 from the flexible seat 38 to permit atmospheric air entering via the openings 58 and the filter 50 to pass through the passage 42 to the control chamber 30. A pressure differential is now created across the movable wall comprised of the wall 26 and diaphragm 28 to acutate the master cylinder 14 and create hydraulic pressure to the wheel cylinders 16 and 18.

As will be readily apparent to those skilled in the art of braking devices, this will create a deceleration force upon the vehicle which, if of sufficient magnitude, will cause the vehicle mass to shift whereby the inclined attitude of the housing 78 will change so that the mass 80 will move forwardly to actuate the piston 74.

This will create a hydraulic pressure in the line 70 that will react on the piston 62 to expand the chamber between it and the housing 60 whereby the housing 60 will contact the rear face of the tubular boss 48, if it has not been positioned thereagainst because of the valve actuation. As the deceleration forces increase so does the hydraulic pressure being generated by the piston 74 so that the push rod 64 is urged backwardly by the piston 62 whereby the operator of the vehicle is controllably oriented to the braking of the automobile.

As for the operation of the structure of FIGURE 2, the driver will depress the brake pedal, as in FIGURE 1 moving mass 104 towards stop 106 to actuate servomotor 86 and pressurize master cylinder 88.

Upon initial creation of deceleration, mass 104, in accordance with its lever arm, will revolve lever 96 about 100 to push back at the operator, so-to-speak.

So long as the gear shift selector 144 is in P, park, N, neutral, D, drive, or L, low, vacuum in manifold 142 is communicated to chamber 112 so that spring 114 is not felt in the initial movement of the brake pedal lever 96 required to open the valving in servomotor 86.

However, in order to preclude self-energization in reverse operation of the automobile, truck or vehicle, the slide valve 120 will be moved when selector 144 is in reverse, R, to open port 130 to chamber 112. As vacuum is exhausted, spring 114 abuts stop 106 on mass 104, and actuation of lever 96 thereafter will have feel derived from spring 114 rather than mass 104.

Before passing onto the claims, another advantage of the structure of FIGURE 1 should be noted, namely, a tendency to acquire limited deceleration by braking due to engine torque at high speeds. In other words a car traveling sixty (60) miles per hour upon release of the accelerator will begin braking by engine torque. The effect of this deceleration on mass 80 will cause expansion of housing 60 to push wall 26 in that pedal 68 is on its rear stop. This will provide sufficient force in many servomotor designs to actuate the braking means onto the braking surfaces.

Having fully described a manner of construction and a method of operation of the principles of my invention, it is now desired to set forth the protection sought in the form of the following claims—

I claim:
1. A means for actuating a servomotor comprising:
   valve means;
   valve operating means including a push rod operatively connected to said valve means and a brake pedal operatively connected to said push rod; and
   deceleration sensing means operatively connected to said servomotor via said valve operating means to provide reaction forces on said brake pedal as a function of deceleration called for by said valve means.

2. A means for actuating a servomotor in accordance with claim 1 and further comprising:
   a mass affixed to said brake pedal above a pivot for said brake pedal which is located in an intermediate area of said brake pedal to provide sufficient leverage for said mass to oppose in accordance with deceleration forces the actuation of the brake pedal.

3. A means in accordance with claim 2 and further comprising a fluid motor for operative connection with said mass to provide feel of operation of said brake pedal with deceleration forces are opposite those which would move said mass to provide feel.

4. A means in accordance with claim 3 and further comprising valve means for controlling said fluid motor which is operated upon selection of reverse gear by a gear selector means.

5. A means for actuating a servomotor comprising:
   valve means;
   valve operating means including a push rod connected to said valve means and a brake pedal connected to said push rod; and
   deceleration sensing means including a mass sensitive to vehicle decelerations, said mass being linked to said brake pedal to impose a force on said brake pedal in opposition to an operator's force thereon when actuating said valve means during deceleration.

6. The structure of claim 5 wherein said deceleration means further includes:
   a fluid pressure motor having a housing between the servomotor and the push rod, and
   a piston within the housing and biased therewithin to be connected to said push rod, which piston is under command of said mass to impose said force via said push rod.

7. The structure of claim 6 wherein said mass includes a rolling ball within a housing attached to the vehicle such that said housing is inclined with respect to the vehicle whereby the vehicle decelerations will be active to lessen the inclination and the ball will create pressure for said piston to which it is operatively linked.

8. The structure of claim 5 wherein said mass of said deceleration sensing means is affixed to said brake pedal by an arm extending above a pivot point for said brake pedal.

9. A means to provide reaction in accordance with deceleration in a power brake servomotor having an operator-operated valve means comprising:
   a valve seat mounted in said servomotor;
   a movable valve poppet carried by said servomotor and operably related to said valve seat;
   a push rod operably connected to said poppet;
   a fluid motor operably connected to said push rod; and
   means sensitive to deceleration forces for expanding said fluid motor to provide reaction forces on said push rod.

10. The structure of claim 9 wherein said valve seat and valve poppet are carried by a tubular boss of a movable wall within said servomotor with said boss extending exteriorly of said servomotor to provide an operative mounting for said fluid motor.

11. The structure of claim 9 wherein said fluid motor includes an annular housing about said push rod with a piston operatively connected to said push rod such that said push rod and motor will move as a unit to actuate said valve.

12. The structure of claim 9, wherein said means sensitive to deceleration include a mass operably arranged to actuate a pressure creating device in fluid communication with said fluid motor.

References Cited

UNITED STATES PATENTS

| | | |
|---|---|---|
| 2,079,409 | 5/1937 | Hunt. |
| 2,467,560 | 4/1949 | Majneri _____ 91—419 |
| 2,957,729 | 10/1960 | Hill. |
| 2,964,270 | 12/1960 | Mercier _____ 91—419 |
| 2,985,487 | 5/1961 | Ayers. |
| 3,163,473 | 12/1964 | Stelzer. |
| 3,168,351 | 2/1965 | Stelzer. |
| 3,377,108 | 4/1968 | Eddy. |

PAUL E. MASLOUSKY, *Primary Examiner.*

U.S. Cl. X.R.

91—376; 303—24